United States Patent Office 3,081,308
Patented Mar. 12, 1963

3,081,308
5-CARBOCYCLIC-3-IMIDOMETHYLOXAZOL-
IDINES AND PROCESS
Max J. Kalm, Skokie, Ill., assignor to G. D. Searle & Co.,
Chicago, Ill., a corporation of Delaware
No Drawing. Filed Dec. 29, 1959, Ser. No. 862,467
16 Claims. (Cl. 260—281)

This invention relates to 5-carbocyclic-3-imidoalkyl-oxazolidines and a process for the manufacture thereof. More particularly, this invention relates to oxazolidines of the formula

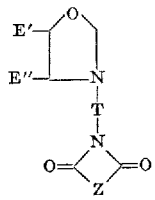

wherein E' represents either an aryl or cycloalkyl radical; E" represents either hydrogen or a saturated monovalent hydrocarbon radical; T represents an alkylene radical, alkenylene, or Z represents an alkylene, alkenylene, or ortho-divalent monocarbocyclic radical consisting of 6 annular carbon atoms to which more than 3 and fewer than 11 hydrogen atoms are attached.

Among the aryl radicals represented by E', especially phenyl and naphthyl radicals optionally substituted by 1 or more halogens and/or alkyl and/or alkoxy radicals are preferred. Illustrative of such radicals but not delimiting are phenyl, halophenyl, (lower alkoxy)phenyl, and poly(lower alkoxy)phenyl radicals. Inasmuch as the radicals referred to are unexceptionably named in accordance with recommendations of the International Union of Pure and Applied Chemistry and Chemical Abstracts (cf. specifically section 75 of the Introduction, With Key and Discussion of the Naming of Chemical Compounds for Indexing, Chemical Abstracts, 39, 5867 ff., with respect to compound radical names), those skilled in the art will readily recognize that halophenyl radicals are radicals of the formula

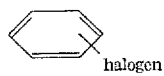
halogen (lower alkoxy)phenyl radicals are radicals of the formula

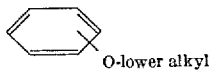
O-lower alkyl and poly(lower alkoxy)phenyl radicals are radicals of the formula

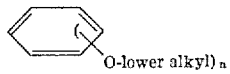
O-lower alkyl)$_n$ wherein $n$ is a positive integer greater than 1 and smaller than 6. Lower alkyl radicals are radicals of the formula —$C_nH_{2n+1}$ wherein $n$ is a positive integer amounting to less than 9, typical of such groupings being methyl, ethyl, propyl, isopropyl, butyl, isobutyl, sec-butyl, tert-butyl, pentyl isopentyl, neopentyl, hexyl, isohexyl, heptyl, and octyl radicals.

When E' in the generic formula for compounds of this invention represents a cycloalkyl radical, cyclopropyl, cyclobutyl, cyclopentyl, cyclohexyl, and cycloheptyl radicals will be understood, the cyclohexyl grouping

being preferred.

By "saturated monovalent hydrocarbon radicals" (cf. definition of E" above), is meant either an alkyl radical—desirably of lower order—or a cycloalkyl radical.

The alkylene radicals represented by T in the generic formula also are desirably of lower order, for example, methylene, ethylene, trimethylene, propylene, tetramethylene, 2,2-dimethyl-1,3-propylene, and like bivalent saturated acyclic straight- or branched-chain hydrocarbon groupings of empirical formula —$C_nH_{2n}$— wherein $n$ is a small positive integer.

The alkylene radicals represented by Z in the generic formula are optimally lower alkylene radicals separating the groups attached thereto by either 2 or 3 carbon atoms, and thus giving rise to succinimides

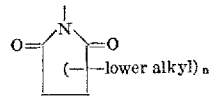

and glutarimides

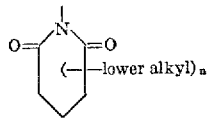

substituted or not by 1 or more lower alkyl radicals, depending upon whether the lower alkylene constituent is branched. It follows that $n$ in the two formulas just preceding is 0 or a positive integer smaller than 5 when the compounds depicted are succinimides, 0 or a positive integer smaller than 7 when they are glutarimides.

Alternatively, when Z in the generic formula represents an alkenylene radical, groupings of the formula —$C_nH_{2n-2}$—

($n$ being a positive integer) are comprehended, especially vinylene radicals

—CH=CH— which give rise to unsubstituted maleimides

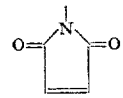

Finally, when Z represents an ortho-divalent monocarbocyclic radical consisting of 6 annular carbon atoms and more than 3 and fewer than 11 hydrogen atoms attached thereto, the compounds comprising it are necessarily cyclohexane-1,2-dicarboximides,

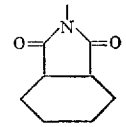

partially aromatized cyclohexane-1,2-dicarboximides such as 1-cyclohexene-1,2-dicarboximides

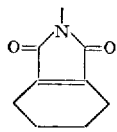

and 2,6-cyclohexadiene-1,2-dicarboximides

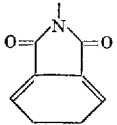

or phthalimides

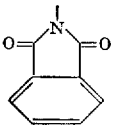

Equivalent to the foregoing compounds for the purposes of this invention are non-toxic acid addition salts thereof, which can be enformulated

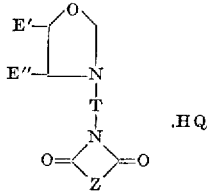

wherein E', E", T, and Z have the meanings previously assigned, and Q is one equivalent of an anion, for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which in combination with the cationic portion of a salt aforesaid, is neither pharmacologically nor otherwise undesirable in pharmaceutical dosage.

The compounds to which this invention relates are useful because of their valuable pharmacological properties. They are characterized by exceptionally potent anorectic, diuretic, and anti-inflammatory activities, the last-named activity being manifest by a substantial capacity to inhibit the heat, swelling, redness, and granuloma-formation characteristic of the inflammatory response to tissue injury. Moreover, the compounds hereof are anti-biotic and anti-fungal agents effective against a variety of pathogenic microorganisms, among them being *E. coli*, *B. subtilis*, and *Trichophyton mentagrophytes*.

Those skilled in the art will appreciate that the carbon atom in position 5 of the oxazolidine ring in the instant compounds is asymmetric; and, accordingly, the compounds exist in a minimum of 2 optically active and 1 racemic forms. When the carbon in position 4 is substituted, an additional 2 optically active and 1 racemic forms occur. The relative pharmacological potency of the various forms can and does vary appreciably. Thus, the oxazolidines of this invention derived from dextronorephedrine—for example, the corresponding 4-methyl-5-phenyl-3-phthalimidomethyloxazolidine — produce an unexpectedly superior and selective anti-inflammatory effect in the animal body.

Manufacture of the imidomethyl compounds hereinafter claimed proceeds by heating an appropriately-substituted oxazolidine of the formula

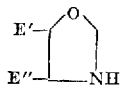

wherein E' and E" are defined as before, with a selected imide of the formula

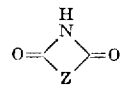

Z being defined as before, in the presence of formalin, using an alcoholic reaction medium. Synthesis is ordinarily completed in as little as 15 minutes when boiling ethanol is the medium of choice.

Corresponding imidoalkyl compounds hereof wherein the alkylene bridge represented by T in the generic formula above comprises more than 1 carbon can be manufactured by substituting a selected haloalkylimide

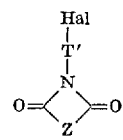

Z being defined as before, T' standing for lower alkylene exclusive of methylene, and Hal for chlorine or bromine, and a base such as trimethylamine, potassium carbonate, or sodium hydroxide, for the imide, formalin, and alcohol called for in the aforesaid manufacture of imidomethyl products. A ketonic solvent such as butanone is employed if the base is a solid.

Conversion of the amine bases of this invention to corresponding acid addition salts is accomplished by simple admixture of these compounds with one equivalent of any of various inorganic and strong organic acids, the anionic portion of which conforms to Q as hereinbefore defined, anhydrous conditions being maintained where the alkylene bridge represented by T is a methylene radical.

A variety of means exist for obtaining optically active forms of the products of this invention from the racemates which prevail when the starting materials for the described syntheses are not stereospecific. Products which occur in crystals with apparently differing arrangements of the faces can be resolved manually, after the technique pioneered by Pasteur. Further, such of the racemates as are fermented by bacteria or molds will be found to undergo this fermentation at varying rates, and appropriate selections of the microorganisms involved enable isolation of a particular stereochemically pure isomer by destruction of any other stereomers present.

Alternatively, one can proceed from optically active starting materials to optically active final products as disclosed in Examples 3–4, 7–8, 20, and 23–24 hereafter.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *Racemic-5-phenyloxazolidine.*—To a suspension of 137 parts of racemic-α-(aminomethyl)benzyl alcohol in 500 parts of water is added approximately 88 parts of aqueous 36% formaldehyde. The resultant mixture is agitated for 10 minutes, during which time an insoluble oil separates. The oil is extracted with chloroform, and the chloroform extract is then dried over anhydrous sodium sulfate and finally stripped of solvent by distillation at 90–95°. The residue thus obtained is the desired racemic-5-phenyloxazolidine.

B. *Racemic - 5 - phenyl - 3 - succinimidomethyloxazolidine.*—To a solution of approximately 45 parts of racemic-5-phenyloxazolidine and approximately 30 parts of succinimide in 200 parts of warm absolute ethanol is added 50 parts of aqueous 36% formaldehyde. The resultant solution is heated at the boiling point under reflux for 15 minutes, then filtered hot. On cooling, the desired racemic-5-phenyl-3-succinimidomethyloxazolidine is precipitated as a crystalline solid, which is collected on a filter and dried in air. The product has the formula

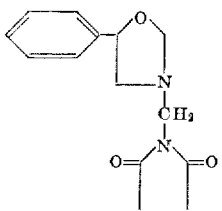

EXAMPLE 2

A. *Racemic - 4 - methyl - 5 - phenyloxazolidine.*—Substitution of 151 parts of racemic-norephedrine for the 137 parts of racemic-α-(aminomethyl)benzyl alcohol called for in Example 1A affords, by the procedure there detailed, racemic - 4 - methyl - 5 - phenyloxazolidine as a yellow oil, which solidifies on prolonged standing.

Substitution of 151 parts of racemic-pseudonorephedrine for the 137 parts of racemic-α-(aminomethyl)-benzyl alcohol called for in Example 1A affords, by the procedure there detailed, racemic-4-methyl-5-phenyloxazolidine as a pale green oil.

Each of the preceding two products is composed of two enantiomorphs individually diastereomeric with those present in the other product.

B. *Racemic - 4 - methyl - 5 - phenyloxazolidine hydrochloride.*—The racemic-4-methyl-5-phenyloxazolidine obtained from racemic-norephedrine as detailed in the preceding Part A of this example, upon dissolution in absolute ethanol and acidification with a slight excess of hydrogen chloride dissolved in 2-propanol, is converted to the hydrochloric acid salt, which is precipitated by adding anhydrous ether. The colorless crystalline racemic-4-methyl-5-phenyloxazolidine hydrochloride which results, recovered on a filter and dried in air, melts at 143–148°.

C. *Racemic - 4 - methyl - 5 - phenyl - 3 - succinimidomethyloxazolidine.*—Substitution of 49 parts of the racemic-4-methyl-5-phenyloxazolidine obtained from racemic-norephedrine as detailed in Part A of this example and 300 parts of absolute ethanol for the 45 parts of racemic-5-phenyloxazolidine and 200 parts of absolute ethanol, respectively, called for in Example 1B affords, by the procedure there described, racemic-4-methyl-5-phenyl-3-succinimidomethyloxazolidine as a white crystalline solid melting at 132–134°.

Substitution of 49 parts of the racemic-4-methyl-5-phenyloxazolidine obtained from racemic-pseudonorephedrine as detailed in Part A of this example for the 45 parts of racemic-5-phenyloxazolidine called for in Example 1B affords, by the procedure there described, racemic - 4 - methyl - 5 - phenyl - 3 - succinimidomethyloxazolidine as a white crystalline solid melting at 70.5–73°.

Each of the two products is composed of two enantiomorphs individually diastereomeric with those present in the other product. The products have the formula

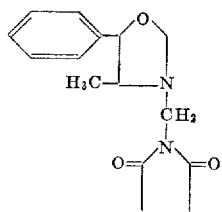

EXAMPLE 3

A. *Dextro - 4 - methyl - 5 - phenyloxazolidine.*—Substitution of 151 parts of dextro-norephedrine for the 137 parts of racemic-α-(aminomethyl)benzyl alcohol called for in Example 1A affords, by the procedure there detailed, dextro-4-methyl-5-phenyloxazolidine as a colorless oil with a specific rotation, referred to the sodium "D" line, of +17.9° in methanol solution.

B. *Dextro-4-methyl - 5 - phenyloxazolidine hydrochloride.*—The dextro-4-methyl-5-phenyloxazolidine obtained from dextro-norephedrine as detailed in the preceding Part A of this example, upon dissolution in absolute ethanol and acidification with a slight excess of hydrogen chloride dissolved in 2-propanol, is converted to the hydrochloric acid salt, which is precipitated by adding anhydrous ether. The colorless crystalline dextro-4-methyl-5-phenyloxazolidine hydrochloride which results, filtered off and recrystallized from a mixture of absolute ethanol and ether, melts at 171.5–174° and has a specific rotation, referred to the sodium "D" line, of +47.1° in methanol solution.

C. *Dextro-4-methyl-5-phenyl-3-succinimidomethyl oxazolidine.*—Substitution of 49 parts of the dextro-4-methyl-5-phenyloxazolidine obtained from dextro-norephedrine as detailed in Part A of this example and 320 parts of absolute ethanol for the 45 parts of racemic-5-phenyloxazolidine and 200 parts of absolute ethanol, respectively, called for in Example 1B affords, by the procedure there described, dextro-4-methyl-5-phenyl-3-succinimidomethyloxazolidine as a white crystalline solid melting at 99–101° and with a specific rotation, referred to the sodium "D" line, of +8.7° in methanol solution.

EXAMPLE 4

A. *Levo-4-methyl-5 - phenyloxazolidine.*—Substitution of 183 parts of levo-norephedrine and 101 parts of aqueous 36% formaldehyde for the 137 parts of racemic-α-(aminomethyl)-benzyl alcohol and 88 parts of aqueous 36% formaldehyde, respectively, called for in Example 1A affords, by the procedure there detailed, levo-4-methyl-5-phenyloxazolidine as a colorless oil characterized by a specific rotation, referred to the sodium "D" line, of −16.9° in methanol solution.

Substitution of 151 parts of levo-pseudonorephedrine for the 137 parts of racemic-α-(aminomethyl)benzyl alcohol called for in Example 1A affords, by the procedure there detailed, levo-4-methyl-5-phenyloxazolidine as a colorless oil characterized by a specific rotation, referred to the sodium "D" line, of −59.7° in methanol solution.

The two products are diastereomers.

B. *Levo-4-methyl-5-phenyl-3-succinimidomethyloxazolidine.*—Substitution of 49 parts of the levo-4-methyl-5-phenyloxazolidine obtained from levo-norephedrine as detailed in the preceding Part A of this example and 280 parts of absolute ethanol for the 45 parts of racemic-5-phenyloxazolidine and 200 parts of absolute ethanol, respectively, called for in Example 1B affords, by the procedure there described, levo-4-methyl-5-phenyl-3-succinimidomethyloxazolidine as white crystalline flakes melting at 97–99.5° and with a specific rotation, referred to the sodium "D" line, of −2.9° in methanol solution.

Substitution of 49 parts of the levo-4-methyl-5-phenyloxazolidine obtained from levo-pseudonorephedrine as detailed in the preceding Part A of this example and 280 parts of absolute ethanol for the 45 parts of racemic-5-phenyloxazolidine and 200 parts of absolute ethanol, respectively, called for in Example 1B affords, by the procedure there described, levo-4-methyl-5-phenyl-3-succinimidomethyloxazolidine as a white crystalline solid melting at 74–77.5° and with a specific rotation, referred to the sodium "D" line, of −57.6° in methanol solution.

The two products are diastereomers.

EXAMPLE 5

*Racemic-3-glutarimidomethyl-4-methyl-5 - phenyloxa-*

*zolidine.*—To a solution of approximately 49 parts of the racemic-4-methyl-5-phenyloxazolidine obtained from racemic-norephedrine as detailed in Example 2A and 35 parts of glutarimide in 200 parts of warm absolute ethanol is added 50 parts of aqueous 36% formaldehyde. The resultant solution is heated at the boiling point under reflux for 15 minutes, then filtered hot. The hot filtrate is diluted with water to the point of incipient precipitation. On cooling, the desired racemic-3-glutarimidomethyl-4-methyl-5-phenyloxazolidine is precipitated. It melts at 92–94° and has the formula

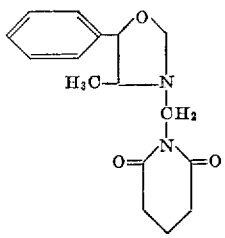

EXAMPLE 6

*Racemic-3-(β-ethyl-β - methylglutarimidomethyl) - 4-methyl-5-phenyloxazolidine.*—Substitution of 48 parts of β-ethyl-β-methylglutarimide and 280 parts of absolute ethanol for the 35 parts of glutarimide and 200 parts of absolute ethanol, respectively, called for in Example 5 affords, by the procedure there detailed, racemic-3-(β-ethyl-β-methylglutarimidomethyl)-4-methyl - 5 - phenyloxazolidine as a white crystalline solid melting at 73–76°.

To a solution of approximately 49 parts of the racemic-4-methyl-5-phenyloxazolidine obtained from racemic-pseudonorephedrine as detailed in Example 2A and 48 parts of β-ethyl-β-methylglutarimide in 200 parts of warm absolute ethanol is added 50 parts of aqueous 36% formaldehyde. The resultant solution is heated at the boiling point under reflux for 15 minutes, then chilled and finally filtered. Dilution of the filtrate with 100 parts of water, followed by refrigeration at 0–5°, causes precipitation of racemic-3-(β-ethyl-β - methylglutarimidomethyl) - 4-methyl-5-phenyloxazolidine as a white crystalline solid melting at 86–88°.

Each of the two products is composed of two enantiomorphs individually diastereomeric with those present in the other product. The products have the formula

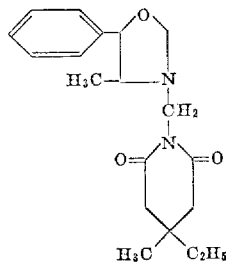

EXAMPLE 7

*Dextro - 3 - (β - ethyl - β - methylglutarimidomethyl)-4-methyl-5-phenyloxazolidine.*—Substitution of 49 parts of the dextro-4-methyl-5-phenyloxazolidine obtained from dextro-norephedrine as detailed in Example 3A, 48 parts of β-ethyl-β-methylglutarimide and 280 parts of absolute ethanol for the 49 parts of racemic-4-methyl-5-phenyloxazolidine, 35 parts of glutarimide, and 200 parts of absolute ethanol, respectively, called for in Example 5 affords, by the procedure there described, dextro-3-(β-ethyl-β-methylglutarimidomethyl) - 4 - methyl-5-phenyloxazolidine as a white crystalline solid melting at 93–95° and further characterized by a specific rotation, referred to the sodium "D" line, of +28.3° in methanol solution.

EXAMPLE 8

*Levo - 3 - (β - ethyl - β - methylglutarimidomethyl)-4-methyl-5-phenyloxazolidine.*—Substitution of 49 parts of the levo-4-methyl-5-phenyloxazolidine obtained from levo-norephedrine as detailed in Example 4A, 48 parts of β-ethyl-β-methylglutarimide, and 280 parts of absolute ethanol for the 49 parts of racemic-4-methyl-5-phenyloxazolidine, 35 parts of glutarimide, and 200 parts of absolute ethanol, respectively, called for in Example 5 affords, by the procedure there described, levo-3-(β-ethyl-β-methylglutarimidomethyl) - 4 - methyl - 5 - phenyloxazolidine as a white crystalline solid melting at 91–94° and with a specific rotation, referred to the sodium "D" line, of −23.2° in methanol solution. This product is the enantiomorph of the product of Example 7.

EXAMPLE 9

A. *Racemic - 5 - (4 - fluorophenyl)-4-methyloxazolidine.*—Substitution of 169 parts of racemic-α-(1-aminoethyl)-4-fluorobenzyl alcohol for the 137 parts of racemic-α-(aminomethyl)benzyl alcohol called for in Example 1A affords, by the procedure there detailed, racemic-5-(4-fluorophenyl)-4-methyloxazolidine.

B. *Racemic - 5 - (4 - fluorophenyl) - 4 - methyl-3-succinimidomethyloxazolidine.*—Substitution of 54 parts of racemic-5-(4-fluorophenyl)-4-methyloxazolidine and 30 parts of succinimide for the 49 parts of racemic-4-methyl-5-phenyloxazolidine and 35 parts of glutarimide, respectively, called for in Example 5 affords, by the procedure there detailed, racemic-5-(4-fluorophenyl)-4-methyl-3-succinimidomethyloxazolidine. The product has the formula

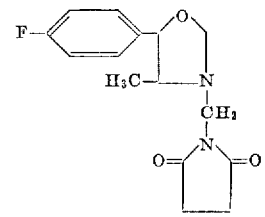

EXAMPLE 10

A. *Racemic - 5 - (4 - chlorophenyl) - 4 - methyloxazolidine.*—Substitution of 358 parts of racemic-α-(1-aminoethyl)-4-chlorobenzyl alcohol, 163 parts of aqueous 36% formaldehyde, and 1000 parts of water for the 137 parts of racemic-α-(aminomethyl)benzyl alcohol, 88 parts of aqueous 36% formaldehyde, and 500 parts of water, respectively, called for in Example 1A affords, by the procedure there detailed, racemic-5-(4-chlorophenyl)-4-methyloxazolidine as a light brown oil.

B. *Racemic - 5 - (4 - chlorophenyl) - 4 - methyl-3-succinimidomethyloxazolidine.*—Substitution of 59 parts of racemic-5-(4-chlorophenyl)-4-methyloxazolidine for the 45 parts of racemic-5-phenyloxazolidine called for in Example 1B affords, by the procedure there detailed, racemic-5-(4-chlorophenyl)-4-methyl - 3 - succinimidomethyloxazolidine which, recrystallized from absolute ethanol, is obtained as colorless needles melting at 113–115.5°. The product has the formula

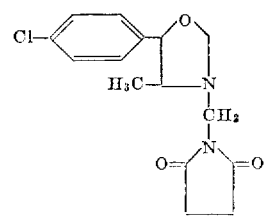

EXAMPLE 11

A. *Racemic - 5 - (4 - iodophenyl) - 4 - methyloxazolidine.*—Substitution of 277 parts of racemic-α-(1-aminoethyl)-4-iodobenzyl alcohol for the 137 parts of racemic-α-(aminomethyl)benzyl alcohol called for in Example 1A affords, by the procedure there detailed, racemic-5-(4-iodophenyl)-4-methyloxazolidine.

B. *Racemic - 5 - (4 - iodophenyl) - 4 - methyl - 3 - succinimidomethyloxazolidine.*—Substitution of 87 parts of racemic-5-(4-iodophenyl)-4-methyloxazolidine and 30 parts of succinimide for the 49 parts of racemic-4-methyl-5-phenyloxazolidine and 35 parts of glutarimide called for, respectively, in Example 5 affords, by the procedure there detailed, racemic-5-(4-iodophenyl)-4-methyl-3-succinimidomethyloxazolidine. The product has the formula

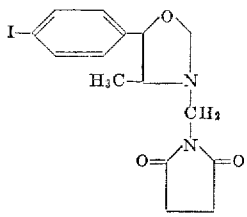

EXAMPLE 12

A. *Racemic - 5 - (4 - methoxyphenyl) - 4 - methyloxazolidine.*—Substitution of 300 parts of racemic-α-(1-aminoethyl)-4-methoxybenzyl alcohol and 117 parts of aqueous 36% formaldehyde for the 137 parts of racemic-α-(aminomethyl)benzyl alcohol and 88 parts of aqueous 36% formaldehyde, respectively, called for in Example 1A affords, by the procedure there detailed, racemic-5-(4-methoxyphenyl)-4-methyloxazolidine as a yellow oil.

B. *Racemic - 5 - (4-methoxyphenyl)-4-methyl-3-succinimidomethyloxazolidine.*—Substitution of 58 parts of racemic - 5 - (4-methoxphenyl)-4-methyloxazolidine for the 45 parts of racemic-5-phenyloxazolidine called for in Example 1B affords, by the procedure there detailed, racemic - 5 - (4 - methoxyphenyl) - 4-methyl-3-succinimidomethyloxazolidine which, recrystallized from absolute ethanol, is obtained as white needles melting at 103–105°. The product has the formula

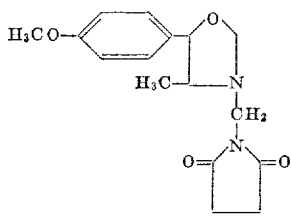

EXAMPLE 13

A. *Racemic-5-(3,4,5-trimethoxyphenyl)-4-methyl-oxazolidine.*—Substitution of 241 parts of racemic-α-(1-aminoethyl)-3,4,5-trimethoxybenzyl alcohol for the 137 parts of racemic-α-(aminomethyl)benzyl alcohol called for in Example 1A affords, by the procedure there detailed, racemic - 5-(3,4,5-trimethoxyphenyl)-4-methyloxazolidine.

B. *Racemic - 5 - (3,4,5-trimethoxyphenyl)-4-methyl-3-succinimidomethyloxazolidine.*—Substitution of 76 parts of racemic-5-(3,4,5-trimethoxyphenyl)-4-methyl-oxazolidine and 30 parts of succinimide for the 49 parts of racemic-4-methyl-5-phenyloxazolidine and 35 parts of glutarimide, respectively, called for in Example 5 affords, racemic - 4 - methyl-5-phenyloxazolidine and 35 parts of glutarimide, respectively, called for in Example 5 affords, by the procedure there detailed, racemic-5-(3,4,5-trimethoxyphenyl) - 4 - methyl-3-succinimidomethyloxazolidine. The product has the formula

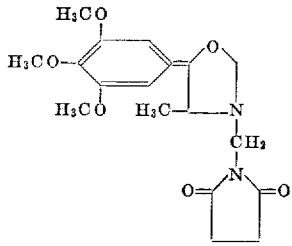

EXAMPLE 14

A. *Racemic - 5-(3,4-diethoxyphenyl)-4-methyl-oxazolidine.*—Substitution of 239 parts of racemic-α-(1-aminoethyl)-3,4-diethoxybenzyl alcohol for the 137 parts of racemic-α-(aminomethyl)benzyl alcohol called for in Example 1A affords, by the procedure there detailed, racemic-5-(3,4-diethoxyphenyl)-4-methyloxazolidine.

B. *Racemic - 5 - (3,4-diethoxyphenyl)-4-methyl-3-succinimidomethyloxazolidine.*—Substitution of 75 parts of racemic-5-(3,4-diethoxyphenyl)-4-methyloxazolidine and 30 parts of succinimide for the 49 parts of racemic-4-methyl-5-phenyloxazolidine and 35 parts of glutarimide, respectively, called for in Example 5 affords, by the procedure there detailed, racemic-5-(3,4-diethoxyphenyl)-4-methyl-3-succinimidomethyloxazolidine. The product has the formula

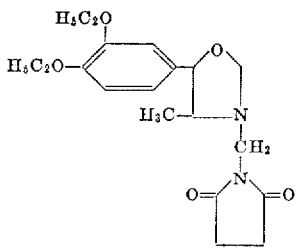

EXAMPLE 15

*Racemic - 3-(β-ethyl-β-methylglutarimidomethyl)-5-(4-methoxyphenyl)-4-methyloxazolidine.*—Substitution of 58 parts of racemic-5-(4-methoxyphenyl)-4-methyloxazolidine and 48 parts of β-ethyl-β-methylglutarimide for the 49 parts of racemic-4-methyl-5-phenyloxazolidine and 35 parts of glutarimide, respectively, called for in Example 5 affords, by the procedure there detailed, racemic-3-(β-ethyl - β-methylglutarimidomethyl)-5-(4-methoxyphenyl)-4-methyloxazolidine which, recrystallized from aqueous ethanol, melts at 61.5–63°. The product is obtained in the form of white needles. It has the formula

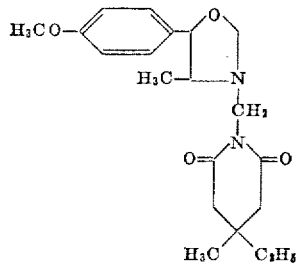

EXAMPLE 16

*Racemic-3-maleimidomethyl-4-methyl-5-phenyloxazolidine.*—Substitution of 49 parts of the racemic-4-methyl-5-phenyloxazolidine obtained from racemic-norephedrine as detailed in Example 2A and 30 parts of maleimide for the 45 parts of racemic-5-phenyloxazolidine and 30 parts of succinimide, respectively, called for in Example 1B affords, by the procedure there described, racemic-3-maleimidomethyl-4-methyl-5-phenyloxazolidine. The product is obtained as white needles melting at 99–102°.

Substitution of 49 parts of the racemic-4-methyl-5- phenyloxazolidine obtained from racemic-pseudonorephedrine as detailed in Example 2A and 30 parts of maleimide for the 45 parts of racemic-5-phenyloxazolidine and 30 parts of succinimide, respectively, called for in Example 1B affords, by the procedure there described, racemic-3-maleimidomethyl-4-methyl-5-phenyloxazolidine as a pale yellow solid melting at 92–96°.

Each of the two products of this example is composed of two enantiomorphs individually diastereomeric with those present in the other product. The products have the formula

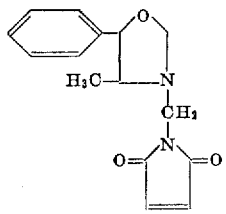

EXAMPLE 17

*Racemic-5-(4-chlorophenyl) - 3 - maleimidomethyl-4-methyloxazolidine.*—Substitution of 59 parts of racemic-5-(chlorophenyl)-4-methyloxazolidine and 30 parts of maleimide for the 45 parts of racemic-5-phenyloxazolidine and 30 parts of succinimide, respectively, called for in Example 1B affords, by the procedure there detailed, racemic-5-(4-chlorophenyl) - 3 - maleimidomethyl - 4-methyloxazolidine which, recrystallized from absolute ethanol, melts at 97–99.5°. The product occurs as pale yellow needles. It has the formula

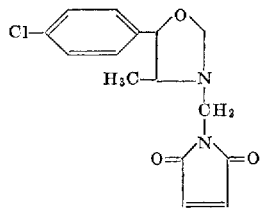

EXAMPLE 18

*Racemic-3-maleimidomethyl-4-methyl-5-(4 - methoxyphenyl) oxazolidine.*—Substitution of 58 parts of racemic-5-(4-methoxyphenyl) - 4 - methyloxazolidine and 30 parts of maleimide for the 45 parts of racemic-5-phenyloxazolidine and 30 parts of succinimide, respectively, called for in Example 1B affords, by the procedure there described, racemic-3-maleimidomethyl - 4 - methyl-5-(4-methoxyphenyl) oxazolidine which, recrystallized from absolute ethanol, is thrown down as off-white needles melting at 116–119°. The product has the formula

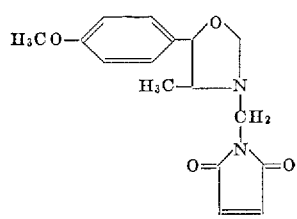

EXAMPLE 19

*Racemic - 3 - (cyclohexane - 1,2 - dicarboximido) - 4-methyl-5-phenyloxazolidine.*—Substitution of 47 parts of cyclohexane-1,2-dicarboximide and 280 parts of absolute ethanol for the 35 parts of glutarimide and 200 parts of absolute ethanol, respectively, called for in Example 5 affords, by the procedure there described, racemic-3-(cyclohexane-1,2-dicarboximido)-4-methyl - 5 - phenyl-oxazolidine as a colorless crystalline solid melting at 64–68°. The product has the formula

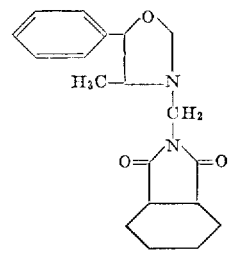

EXAMPLE 20

*Levo-3-(cyclohexane-1,2-dicarboximido)-4-methyl - 5-phenyloxazolidine.*—Substitution of 35 parts of the levo-4 - methyl - 5 - phenyloxazolidine obtained from levo-norephedrine as detailed in Example 4A, 33 parts of cyclohexane-1,2-dicarboximide, 38 parts of aqueous 36% formalin, and 280 parts of absolute ethanol for the 45 parts of racemic-5-phenyloxazolidine, 30 parts of succinimide, 50 parts of aqueous 36% formaldehyde, and 200 parts of absolute ethanol, respectively, called for in Example 1B affords, by the procedure there described levo-3-(cyclohexane-1,2-dicarboximido) - 4 - methyl - 5-phenyloxazolidine as a colorless crystalline solid melting at 55–62°. The product is further characterized by a specific rotation, referred to the sodium "D" line, of −2.1° in methanol. It is one of the two enantiomorphs which compose the product of Example 19.

EXAMPLE 21

*Racemic-3-(1-cyclohexene - 4,5 - dicarboximido) - 4-methyl-5-phenyloxazolidine.*—Substitution of 49 parts of the racemic-4-methyl-5-phenyloxazolidine obtained from racemic-norephedrine as detailed in Example 2A, 46 parts of 1-cyclohexene-4,5-dicarboximide, and 280 parts of absolute ethanol for the 45 parts of racemic-5-phenyloxazolidine, 30 parts of succinimide, and 200 parts of absolute ethanol, respectively, called for in Example 1B affords, by the procedure there described, racemic-3-(1-cyclohexene-4,5-dicarboximido) - 4 - methyl - 5 - phenyl-oxazolidine as an off-white solid melting at 98.5–100.5°.

Substitution of 49 parts of the racemic-4-methyl-5-phenyloxazolidine obtained from racemic-pseudo-nor-ephedrine as detailed in Example 2A and 46 parts of 1-cyclohexene-4,5-dicarboximide for the 49 parts of racemic-4-methyl-5-phenyloxazolidine and 35 parts of glutarimide, respectively, called for in Example 5 affords, by the procedure there described, racemic-3-(1-cyclohexene-4,5-dicarboximido)-4-methyl - 5 - phenyloxazolidine as an off-white solid melting at 92.5–95°.

Each of the two products of this example is composed of two enantiomorphs individually diastereomeric with those present in the other product. The products have the formula

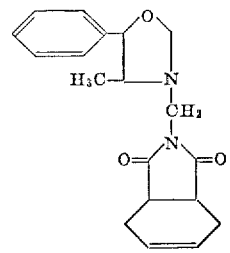

EXAMPLE 22

*Racemic-4-methyl - 5 - phenyl - 3 - phthalimidomethyl-oxazolidine.*—Substitution of 45 parts of phthalimide, 49 parts of the racemic-4-methyl-5-phenyloxazolidine obtained from racemic-norephedrine as detailed in Example 2A, and 600 parts of absolute ethanol for the 45 parts of racemic-5-phenyloxazolidine, 30 parts of succinimide, and 200 parts of absolute ethanol, respectively, called for in Example 1B affords, by the procedure there described, racemic - 4 - methyl - 5 - phenyl-3-phthalimidomethyloxazolidine as a colorless crystalline product melting at 111–113°.

Substitution of 49 parts of the racemic-4-methyl-5-phenyloxazolidine obtained from racemic-pseudonorephedrine as detailed in Example 2A and 45 parts of phthalimide for the 45 parts of racemic-5-phenyloxazolidine and 30 parts of succinicide, respectively, called for in Example 1B affords, by the procedure there described, racemic - 4 - methyl-5-phenyl - 3 - phthalimidomethyloxazolidine as a white powder melting at 91.5–94.5°.

Each of the two products of this example is composed of two enantiomorphs individually diastereomeric with those present in the other product. The products have the formula

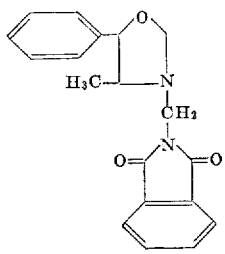

EXAMPLE 23

*Dextro-4-methyl - 5 - phenyl-3-phthalimidomethyloxazolidine.*—Substitution of 43 parts of levo-4-methyl-5-phenyloxazolidine obtained from levo-norephedrin as detailed in Example 4A, 40 parts of phthalimide, 44 parts of aqueous 36% formaldehyde, and 400 parts of absolute ethanol for the 45 parts of racemic-5-phenyloxazolidine, 30 parts of succinimide, 50 parts of aqueous 36% formaldehyde, and 200 parts of absolute ethanol, respectively, called for in Example 1B affords, by the procedure there described, dextro - 4 - methyl-5-phenyl - 3 - phthalimidomethyloxazolidine as a white crystalline solid melting at 106.5–108.5°. The product is further characterized by a specific rotation, referred to the sodium "D" line, of +6.2° in methanol solution. It is one of the two enantiomorphs which compose the racemic-4-methyl-5-phenyl-3-phthalimidomethyloxazolidine melting at 111–113° and described in Example 22.

EXAMPLE 24

*Levo-4-methyl-5-phenyl - 3 - phthalimidomethyloxazolidine.*—Substitution of 49 parts of dextro-4-*methyl*-5-phenyloxazolidine obtained from dextro-norephedrin as detailed in Example 3A and 45 parts of phthalimide for the 45 parts of racemic-5-phenyloxazolidine and 30 parts of succinimide, respectively, called for in Example 1B affords, by the procedure there described, levo-4-methyl-5-phenyl-3-phthalimidomethyloxazolidine as white needles melting at 108–110° and with a specific rotation, referred to the sodium "D" line, of −7.5° in methanol solution. The product is the enantiomorph of the product of Example 23.

EXAMPLE 25

*Racemic-5 - (4-chlorophenyl)-4-methyl-3-phthalimidomethyloxazolidine.*—Substitution of 59 parts of racemic-5-(4-chlorophenyl)-4-methyloxazolidine and 45 parts of phthalimide for the 45 parts of racemic-5-phenyloxazolidine and 30 parts of succinimide, respectively, called for in Example 1B affords, by the procedure there described, racemic-5-(4 - chlorophenyl) - 4 - methyl-3-phthalimido-methyloxazolidine as white needles melting at 115–118°. The product has the formula

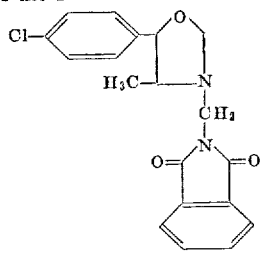

EXAMPLE 26

*Racemic-5-(4 - methoxyphenyl)-4-methyl-3-phthalimidomethyloxazolidine.*—Substitution of 58 parts of racemic-5-(4-methoxyphenyl) - 4 - methyloxazolidine and 45 parts of phthalimide for the 45 parts of racemic-5-phenyloxazolidine and 30 parts of succinimide, respectively, called for in Example 1B affords, by the procedure there described, racemic - 5 - (4 - methoxyphenyl)-4-methyl-3-phthalimidomethyloxazolidine which, recrystallized from absolute ethanol, melts at 127–129°. The product occurs as white needles. It has the formula

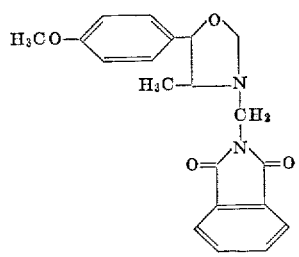

EXAMPLE 27

A. *Racemic - 5 - cyclohexyl - 4 - methyloxazolidine.*—Substitution of 79 parts of racemic-α-(1-aminoethyl)cyclohexanemethanol, 44 parts of aqueous 36% formaldehyde, and 250 parts of water for the 137 parts of racemic-α-(aminomethyl)benzyl alcohol, 88 parts of aqueous 36% formaldehyde, and 500 parts of water, respectively, called for in Example 1A affords, by the procedure there described racemic-5-cyclohexyl-4-methyloxazolidine as a light brown oil which partially solidifies on prolonged standing.

B. *Racemic-5-cyclohexyl - 4 - methyloxazolidine hydrochloride.*—The racemic-5-cyclohexyl-4-methyloxazolidine obtained by the procedure of the foregoing Part A of this example, upon dissolution in absolute ethanol and acidification with a slight excess of hydrogen chloride dissolved in 2-propanol, is converted to the hydrochloric acid salt, which is precipitated by adding anhydrous ether. The colorless crystalline racemic-5-cyclohexyl-4-methyloxazolidine hydrochloride which results melts at 137.5–140°.

C. *Racemic-5-cyclohexyl-4-methyl - 3 - succinimidomethyloxazolidine.*—Substitution of 51 parts of racemic-5-cyclohexyl-4-methyloxazolidine, 30 parts of succinimide, and 400 parts of absolute ethanol for the 49 parts of racemic-4-methyl-5-phenyloxazolidine, 35 parts of glutarimide, and 200 parts of absolute ethanol, respectively, called for in Example 5 affords, by the procedure there described, racemic-5-cyclohexyl-4-methyl-3-succinimidomethyloxazolidine as a white crystalline solid melting at 73–75°. The product has the formula

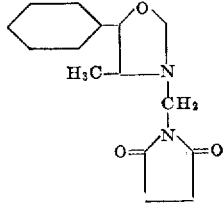

EXAMPLE 28

*Racemic-5-cyclohexyl-3-maleimidomethyl - 4 - methyloxazolidine.*—Substitution of 51 parts of racemic-5-cyclohexyl-4-methyloxazolidine and 30 parts of maleimide for the 45 parts of racemic-5-phenyloxazolidine and 30 parts of succinimide, respectively, called for in Example 1B affords, by the procedure there described, racemic-5-cyclohexyl-3-maleimidomethyl-4-methyloxazolidine which, recrystallized from absolute ethanol, melts at 82.5–88°. The product is a green-yellow solid. It has the formula

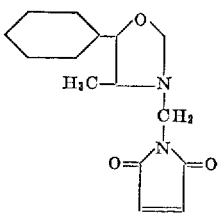

EXAMPLE 29

*Racemic-5-cyclohexyl-4-methyl-3 - phthalimidomethyloxazolidine.*—Substitution of 51 parts of racemic-5-cyclohexyl-4-methyloxazolidine, 45 parts of phthalimide, and 600 parts of absolute ethanol for the 45 parts of racemic-5-phenyloxazolidine, 30 parts of succinimide, and 200 parts of absolute ethanol, respectively, called for in Example 1B affords, by the procedure there described, racemic-5-cyclohexyl-4-methyl - 3 - phthalimidomethyloxazolidine as a colorless crystalline solid melting at 90.5–93°. The product has the formula

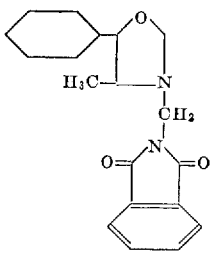

What is claimed is:
1. A member of the class consisting of dextro, levo, and racemic compounds of the formula

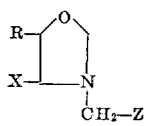

wherein R represents a member of the class consisting of phenyl, halophenyl, (lower alkoxy)phenyl, poly(lower alkoxy)phenyl, and cyclohexyl; X represents a member of the class consisting of hydrogen and lower alkyl; and Z represents a member of the class consisting of succinimido, glutarimido, β-methyl-β - ethylglutarimido, maleimido, cyclohexane-1,2-dicarboximido, 1-cyclohexene-4,5 - dicarboximido, and phthalimido.

2. A compound of the formula

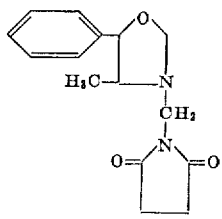

3. Dextro-4-methyl-5-phenyl - 3 - succinimidomethyloxazolidine.

4. A compound of the formula

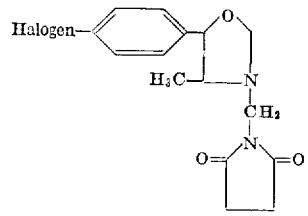

5. Racemic-5-(4-chlorophenyl)-4-methyl-3-succinimidomethyloxazolidine.

6. A compound of the formula

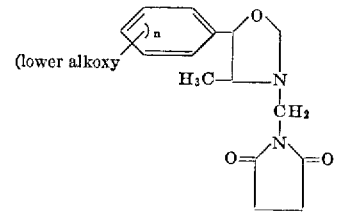

wherein *n* is a positive integer amounting to less than 4.

7. Racemic-5-(4-methoxyphenyl) - 4-methyl-3-succinimidomethyloxazolidine.

8. Racemic - 3 - maleimidomethyl-4-methyl-5-phenyloxazolidine.

9. A compound of the formula

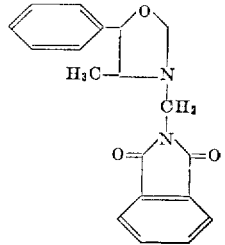

10. Levo-4-methyl-5-phenyl-4 - phthalimidomethyloxazolidine.

11. Racemic - 5 - cyclohexyl - 3 - maleimidomethyl-4-methyloxazolidine.

12. In a process for the manufacture of dextro, levo, and racemic compounds of the formula

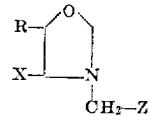

wherein R represents a member of the class consisting of phenyl, halophenyl, (lower alkoxy)phenyl, poly(lower alkoxy)phenyl, and cyclohexyl; X represents a member of the class consisting of hydrogen and lower alkyl; and Z represents a member of the class consisting of succinimido, glutarimido, β-methyl-β-ethylglutarimido, maleimido, cyclohexane-1,2-dicarboximido, 1-cyclohexene-4,5-dicarboximido, and phthalimido, the step which comprises heating an oxazolidine of the formula

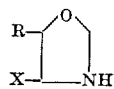

wherein R and X are defined as before, with an imide of the formula

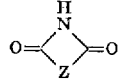

Z being defined as before, in the presence of aqueous formaldehyde, using alcohol as solvent.

13. A compound of the formula
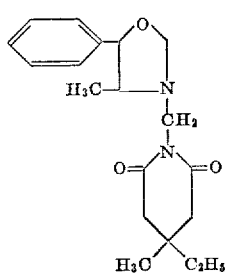
14. A compound of the formula
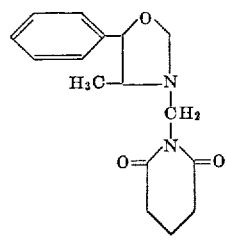
15. A compound of the formula
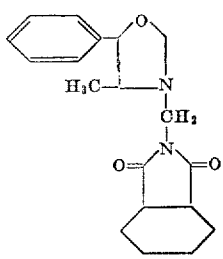
16. A compound of the formula
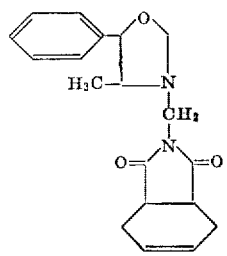
No references cited.

UNITED STATES PATENT OFFICE
CERTIFICATE OF CORRECTION

Patent No. 3,081,308                                   March 12, 1963

Max J. Kalm

It is hereby certified that error appears in the above numbered patent requiring correction and that the said Letters Patent should read as corrected below.

Column 6, line 38, for "(aminomethyl)-benzyl" read -- (aminomethyl)benzyl --; column 9, lines 73 and 74, strike out "racemic-4-methyl-5-phenyloxazolidine and 35 parts of glutarimide, respectively, called for in Example 5 affords,"; column 10, line 15, for "-methyl-oxazoli-", in italics, read -- -methyloxazoli- --, in italics; column 11, line 26, for "-(chlorophenyl)-" read -- -(4-chlorophenyl)- --; column 12, line 46, for "-pseudo-nor-" read -- -pseudonor- --; column 13, line 10, for "succinicide" read -- succinimide --.

Signed and sealed this 31st day of March 1964.

(SEAL)
Attest:
ERNEST W. SWIDER

Attesting Officer

EDWARD J. BRENNER

Commissioner of Patents